(12) United States Patent
Namiranian

(10) Patent No.: US 10,368,230 B2
(45) Date of Patent: Jul. 30, 2019

(54) DATA ENHANCEMENTS FOR ESIM PROFILE OPERATION CALLBACKS

(71) Applicant: T-Mobile USA, Inc., Bellevue, WA (US)

(72) Inventor: Babak Namiranian, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/816,753

(22) Filed: Nov. 17, 2017

(65) Prior Publication Data

US 2019/0028882 A1    Jan. 24, 2019

Related U.S. Application Data

(60) Provisional application No. 62/535,192, filed on Jul. 20, 2017.

(51) Int. Cl.
  *H04W 4/00*   (2018.01)
  *H04W 8/18*   (2009.01)
  (Continued)

(52) U.S. Cl.
  CPC ............ *H04W 8/183* (2013.01); *H04W 4/70* (2018.02); *H04W 4/14* (2013.01)

(58) Field of Classification Search
  CPC .......... H04W 8/183; H04W 4/70; H04W 4/14
  See application file for complete search history.

(56) References Cited

U.S. PATENT DOCUMENTS 9,572,016 B2   2/2017 Cormier et al.
9,705,546 B2   7/2017 Lee et al.
(Continued)

FOREIGN PATENT DOCUMENTS

EP   2858393 A1   4/2015
KR   20130027096 A   3/2013
(Continued)

OTHER PUBLICATIONS

The International Search Report and Written Opinion for PCT Application No. PCT/US2018/042181 dated Oct. 29, 2018, 11 pages.

(Continued)

*Primary Examiner* — Pakee Fang
(74) *Attorney, Agent, or Firm* — Han Santos, PLLC

(57) ABSTRACT

A command is sent for a machine-to-machine (M2M) device to perform an operation on an embedded subscriber identity module (eSIM) profile stored in an embedded universal integrated circuit card (eUICC) of the M2M device. The operation is request by a backend service of a wireless communication carrier. A confirmation message is then received from the M2M device indicating that the operation on the eSIM profile is performed. Accordingly, a callback message is sent to the backend service of the wireless communication carrier indicating that the operation is performed. The callback message includes an eUICC identifier (ID) of the eUICC or an Integrated Circuit Card identifier (ICCID) of the eSIM profile. The eUICC ID or the ICCID is used by the backend service to locate a profile state entry of the eSIM profile in an eSIM profile state database for update with a profile state of the eSIM profile.

20 Claims, 5 Drawing Sheets

(51) Int. Cl.
*H04W 4/70* (2018.01)
*H04W 4/14* (2009.01)

(56) References Cited

U.S. PATENT DOCUMENTS

| | | | |
|---|---|---|---|
| 9,712,996 B2 | 7/2017 | Park | |
| 2010/0311404 A1 | 12/2010 | Shi et al. | |
| 2013/0301617 A1* | 11/2013 | Kuhn | H04W 36/0085 370/331 |
| 2014/0140507 A1* | 5/2014 | Park | H04W 8/245 380/247 |
| 2014/0308991 A1* | 10/2014 | Lee | H04W 8/183 455/558 |
| 2015/0110035 A1 | 4/2015 | Lee et al. | |
| 2015/0305004 A1* | 10/2015 | Ohta | H04W 16/04 370/330 |
| 2016/0020802 A1 | 1/2016 | Lee et al. | |
| 2016/0094930 A1 | 3/2016 | Ramanna et al. | |
| 2016/0119780 A1 | 4/2016 | Jung et al. | |
| 2016/0283216 A1 | 9/2016 | Gao | |
| 2016/0302070 A1 | 10/2016 | Yang et al. | |
| 2016/0316356 A1* | 10/2016 | Li | H04W 8/183 |
| 2017/0048713 A1 | 2/2017 | Guday et al. | |
| 2017/0070878 A1 | 3/2017 | Anslot et al. | |
| 2017/0150356 A1 | 5/2017 | Li et al. | |
| 2017/0171742 A1 | 6/2017 | Yang | |
| 2018/0014178 A1* | 1/2018 | Baek | H04W 8/265 |
| 2018/0109942 A1* | 4/2018 | Lipovkov | H04W 8/183 |
| 2018/0123803 A1 | 5/2018 | Park et al. | |
| 2018/0131699 A1 | 5/2018 | Park et al. | |
| 2018/0160294 A1* | 6/2018 | Lee | H04W 12/10 |
| 2018/0176768 A1* | 6/2018 | Baek | H04W 8/205 |
| 2018/0295500 A1 | 10/2018 | Yang | |

FOREIGN PATENT DOCUMENTS

| | | |
|---|---|---|
| KR | 20140024796 A | 3/2014 |
| KR | 20170007807 A | 1/2017 |
| KR | 20170077489 A | 7/2017 |
| WO | 2014131785 A1 | 9/2014 |
| WO | 2016013827 A1 | 1/2016 |
| WO | 2016091414 A1 | 6/2016 |
| WO | 2016167551 A1 | 10/2016 |

OTHER PUBLICATIONS

The International Search Report and Written Opinion for PCT Application No. PCT/US2018/042182 dated Oct. 25, 2018, 9 pages.
The International Search Report and Written Opinion for PCT Application No. PCT/US2018/042183 dated Oct. 25, 2018, 10 pages.
The International Search Report and Written Opinion for PCT Application No. PCT/US2018/042185 dated Oct. 29, 2018, 10 pages.
The Non-Final Office Action for U.S. Appl. No. 15/816,793 dated Oct. 25, 2018, 37 pages.
The Non-Final Office Action for U.S. Appl. No. 15/816,826 dated Nov. 13, 2018, 45 pages.
U.S. Appl. No. 15/816,793, Final Office Action, dated Mar. 8, 2019, 31 pages.

* cited by examiner

DATA ENHANCEMENTS FOR ESIM PROFILE OPERATION CALLBACKS

CROSS REFERENCE TO RELATED PATENT APPLICATION

This application claims priority to U.S. Provisional Patent Application No. 62/535,192, filed on Jul. 20, 2017, entitled "Subscription Managers," which is hereby incorporated by reference in its entirety.

BACKGROUND

The use of embedded universal integrated circuit cards (eUICCs), also referred to as embedded subscriber identity modules (eSIMs), are becoming increasingly prevalent in consumer and machine-to-machine (M2M) communication fields. Unlike a traditional UICC or SIM card that exists as a removable smart card that is transferable between multiple device, an eUICC is an integrated circuit that is not designed to be user removable, i.e., it is generally embedded with or soldered to other electronic components of a device.

An eUICC may be provisioned with one or more eSIM profiles, in which each eSIM profile contains a unique international mobile subscriber identity (IMSI) number that enables a corresponding device to obtain telecommunication services from a wireless communication carrier. Other data that are stored in the eSIM profile may include carrier network information, security authentication information, a list of accessible network services, and/or so forth. The wireless communication carrier may transfer an eSIM profile to the eUICC via an over-the-air (OTA) update. M2M devices are networked machines that use the telecommunication services provided by the wireless carrier to communicate with other machines. For example, a M2M monitoring device that is embedded in a vehicle may automatically send vehicle tracking and operation information to a remote support device at a control center. In another example, a M2M device in the form of a smart home appliance may automatically send diagnostic information to a monitoring device at a service center in case of appliance malfunction. Accordingly, a M2M device that is equipped with an eUICC may be remotely set up to receive telecommunication services from a wireless communication carrier without having to be provisioned with a physical SIM card from the wireless communication carrier.

Additionally, once an eSIM profile is installed on an eUICC of a M2M device, the wireless telecommunication carrier may perform remote operations with respect to the eSIM profile. The remote operations may include remotely activating the eSIM profile so that the M2M device can authenticate to and obtain telecommunication services from the wireless communication carrier. The remote operations may further include remotely disabling the eSIM profile to terminate the access of the M2M device to the telecommunication services, or remotely deleting the eSIM profile from the eUICC of the M2M device.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
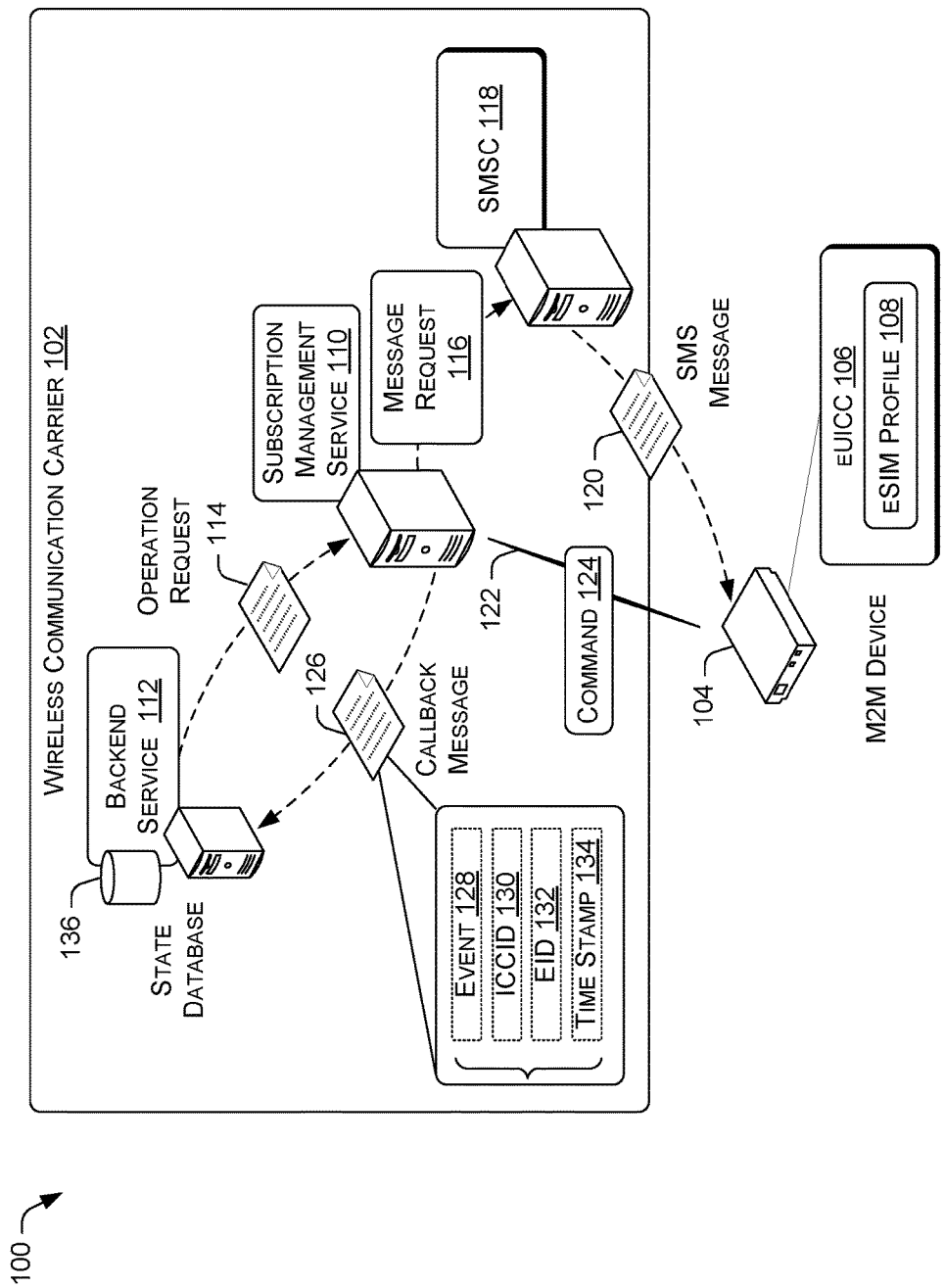
FIG. 1 illustrates an example architecture that enables a wireless communication carrier to implement data enhancements for eSIM profile operation callbacks.

This disclosure is directed to techniques that enable a subscription management service to send data enhanced callback messages back to a backend service of a wireless communication carrier following a completion of an operation on the eSIM profile of an eUICC onboard a M2M device. In various embodiments, the subscription management service is provided by one or more subscriber managers of the wireless communication carrier, such as a Subscription Manager Data Preparation (SM-DP), and/or a Subscription Manager Secure Routing (SM-SR).

The backend service may send a request for the subscription management service to initiate a performance of an operation on the eSIM profile. For example, the operation may be to enable, disable, or delete the eSIM profile from the eUICC onboard the M2M device. In turn, the subscription management service may initiate the M2M device to perform the operation on the eSIM profile. Once the operation is performed, the subscription management service may receive an acknowledgement of the operation performance. In turn, the subscription manager service may send a callback message back to the backend service of the wireless communication carrier to inform the backend service that the operation on the eSIM profile is performed. In various embodiments, the callback message contains enhanced transaction data that include an Integrated Circuit Card Identifier (ICCID) that identifies the eSIM profile, an eUICC ID (EID) that identifies the eUICC, and/or a timestamp. Accordingly, the backend service of the wireless communication carrier may use the ICCID or the EID to locate a profile state entry for the eSIM profile in a profile state database, so that the profile state of the eSIM profile may be updated based on the operation performed. Further, additional backend services of the wireless communication carrier and/or third-party services may obtain the updated profile state of the eSIM profile from the profile state database, or be notified of the updated profile state of the eSIM profile by the backend service.

In contrast, a callback message that is sent by a conventional subscription manager in the same scenario contains only a transaction identifier. The transaction identifier may be an identifier that is initiated generated by the backend service for initiating the operation request to the subscription manager. As a result, the backend service has to maintain a lookup database that tracks each transaction identifier and a corresponding ICCID of the eSIM for which an operation is requested, and/or a EID of the associated eUICC. Accordingly, when the backend service receives the callback message with only the transaction identifier, the backend service has to use the lookup database to translate the transaction identifier into the corresponding ICCID or EID. The corresponding ICCID or EID is then used by the backend service to locate and update the correct profile state entry of the eSIM profile in the profile state database.

While individual uses of the lookup database to translate a transaction identifier to a corresponding ICCID or EID for the purpose of updating a profile state of an eSIM profile deployed in a M2M is relatively quick, M2M devices are often deployed in bulk by a customer. For example, a M2M device vendor may deploy upwards of tens of thousands of M2M devices, and then sign a contract with the wireless communication carrier to provide telecommunication services for these M2M devices. This means a backend service of the wireless communication carrier may have to process tens of thousands of operation requests for the eSIM profiles deployed on these M2M devices in a short amount of time. As a result, the cumulative time that the backend service spends to maintain and use the lookup table to translate transaction identifiers into ICCIDs for updating eSIM profile states can become enormous. The ability of the subscription management service to return callback messages that contain enhanced transaction data may save the backend service from consuming valuable computational time and processing resources that can be directed to other uses. Furthermore, the use of enhanced transaction data by the backend service to expedite the update of eSIM profile states that reflected operational changes to eSIM profiles may be critical for time sensitive deployment and/or operational changes to M2M devices that perform key functions. The techniques described herein may be implemented in a number of ways. Example implementations are provided below with reference to the following FIGS. 1-5.

Example Architectures

FIG. 1 illustrates an example architecture 100 that enables a wireless communication carrier to implement data enhancements for eSIM profile operation callbacks. The wireless communication carrier 102 may also be referred to as a mobile network operator (MNO). The wireless communication carrier 102 may provide a wide range of mobile communication services, as well as ancillary services and features, to subscribers and associated mobile device users. In various embodiments, the wireless communication carrier 102 may provide wireless communication between multiple user devices. Further, the wireless communication carrier 102 may also provide communications between the multiple user devices and user devices that are serviced by other telecommunications networks. The telecommunication services provided may include voice communication, multimedia communication, data communication, such as email, messaging, content streaming, content uploading, and/or so forth.

The wireless communication carrier 102 may be implemented using multiple interconnected networks. In various embodiments, the wireless communication carrier 102 may include multiple Radio Access Networks (RANs). The RANs may be connected to each other via regional ground networks. In turn, the regional ground networks may be connected to a core network by a wide area network (WAN). Each regional portion of the wireless communication carrier 102 may include one or more RANs and a regional circuit and/or packet switched network and associated signaling network facilities. The wireless communication carrier 102 may provide telecommunication services in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), 5th Generation (5G), and/or so forth. In some embodiments, the core network of the wireless communication carrier 102 may be accessed via wired or wireless local area networks (LANs). For example, a wireless local area network may be a network that is established using Wi-Fi or Bluetooth standards and hardware.

A RAN of the wireless communication carrier 102 may include a number of base stations, also referred to as network cells. In some embodiments, the base stations may be in the form of nodes. Each node may include a base transceiver system (BTS) that communicates via an antennae system over an air-link with one or more user devices that are within range. The BTS may send radio communication signals to user devices and receive radio communication signals from user devices. The RANs may carry the communications of the user devices between the respective base stations and a core network of the wireless communication carrier 102. The core network may connect to a public packet data communication network, such as the Internet. Data and voice communications via the RANs, the core network, and the Internet may support a variety of telecommunication services through the wireless communication carrier 102.

In various embodiments, 2G and/or 3G network components of the wireless communication carrier 102 may include a serving GPRS support node (SGSN) that routes voice calls to and from the public switched telephone network (PSTN), a Gateway GPRS Support Node (GGSN) that handles the routing of data communication between external packet switched networks and the core network. The network components may further include a Packet Data Network (PDN) gateway (PGW) that routes data traffic between the GGSN and the Internet. The LTE components of the wireless communication carrier 102 may include an Evolved Packet Core (EPC) and an IP Multimedia Subsystem (IMS) core.

The wireless communication carrier 102 may provide telecommunication services to multiple user devices, such as the M2M device 104. In various embodiments, the user devices may include a smartphone, a tablet computer, a smartwatch, an embedded computer system, or any other device that is capable of obtain telecommunication and/or data communication services from the wireless communication carrier 102. The M2M device may be a networked machine that uses the telecommunication services provided by the wireless carrier to communicate with other machines. The M2M device 104 may be equipped with an eUICC 106, i.e., an integrated circuit chip that is directly wired or soldered to a circuit board of the user device. The eUICC 106 may store one or more eSIM profiles, such as the eSIM profile 108. Each eSIM profile may include information for accessing telecommunication services provided by a corresponding wireless communication carrier, such as the wireless communication carrier 102. Such information may include an Integrated Circuit Card Identifier (ICCID) that identifies the eSIM profile, an eUICC ID (EID) of the eUICC, an international mobile subscriber identity (IMSI) number, security authentication information, an operator profile that enables the eUICC to authenticate with the wireless communication network, and/or so forth. The M2M device 104 may be further equipped with a modem that enables the M2M device 104 to perform telecommunication and data communication with the wireless communication carrier 102. Accordingly, the modem may encode digital information for transmission in uplink radio signals to the wireless communication carrier 102, as well as decode digital information that are received from the wireless communication carrier 102 via downlink radio signals.

The M2M device 104 may receive eSIM profiles for storage on the eUICC 106 via over-the-air (OTA) updates from wireless communication carriers. For example, a subscription management service 110 of the wireless communication carrier 102 may send one or more data packets that contain an eSIM profile 108 to the modem of the M2M device 104 via downlink communication. The data packets are assembled by the software of the modem into the eSIM profile 108 and sent to the eUICC 106 for installation in the eUICC 106.

The core network of the wireless communication carrier 102 may provide subscription management service 110 for managing of eSIM profiles that are installed in the eUICCs of subscriber user devices. In various embodiments, the subscription management service 110 may be provided by one or more subscription managers, such as a Subscription Manager Data Preparation (SM-DP), and/or a Subscription Manager Secure Routing (SM-SR). The SM-DP is a service that configures an eSIM profile for OTA delivery to an eUICC, and the SM-SR is a service that securely delivers the eSIM profile to the eUICC, among other services. In various embodiments, the subscription management service 110 may be hosted at a data center of the wireless communication network 102 or hosted at a third-party data center for the benefit of the wireless communication network 102. For example, an eSIM manufacturer (EUM) may host the subscription management service 110 in its data center.

The core network of the wireless communication may further include one or more backend servers that provide backend services, such as backend service 112. The backend service 112 may be provided by business support systems (BSS) and/or operation support systems (OSS) of the wireless communication carrier 102. The backend services provided by the BSS may include product management, order management, revenue management, and customer management. The backend services provided by the OSS may include network inventory, service provisioning, network configuration, and fault management. Accordingly, the backend service 112 may initiate requests to perform operations on eSIM profiles that are deployed in the eUICCs of user devices, such as the M2M device 104. The operations may include activating, disabling, and deleting the eSIM profiles. In some instances, the backend service 112 may initiate the requests to support the operations of the wireless communication carrier 102. In other instances, the backend service 112 may initiate such requests on behalf of partners, such as M2M device vendors, M2M device operators, content providers, service providers, and/or so forth. The backend service 112 may interface with the subscription management service 110 via one or more application programming interfaces (APIs) of either service using predefined subroutines and protocols.

In various embodiments, the backend service 112 may send an operation request 114 to the subscription management service 110, in which the operation request 114 may ask the subscription management service 110 to perform a particular operation with respect to the eSIM profile 108. The operation request 114 may identify the eSIM profile via an ICCID of the eSIM profile 108 or an EID of the eUICC 106. In some instances, the operation request 114 may include a transaction identifier that is assigned by the backend service 112 to the request. In response, the subscription management service 110 may receive the operation request 114 and return an acknowledgement to the backend service 112. Furthermore, the subscription management service 110 may send a text message to the M2M device 104. The text message may prompt the M2M device 104 to establish a communication connection with the subscription management service 110. For example, the subscription management service 110 may send a message request 116 to a short message service center (SMSC) 118 of the wireless communication carrier 102. The message request 116 may include routing information for delivering the communication connection establishment prompt to the M2M device 104. In turn, the SMSC 118 may send the text message, such as a short messaging service (SMS) request message 120, to the M2M device 104. The text message may cause the M2M device 104 to contact the subscription management service 110 so that a communication connection 122 is created between the subscription management service 110 and the M2M device 104.

Following the establishment of the communication connection 122, the subscription management service 110 may use the connection to send a command 124 for the M2M device 104 to perform the operation with respect to the eSIM profile 108 that is requested by the operation request 114. For example, the operation may involve activating the eSIM profile 108 for use to receive telecommunication services from the wireless communication carrier 102, disabling the eSIM profile 108 to terminate access of the M2M device to the telecommunication services, or deleting the eSIM profile 108 from the eUICC 106. In turn, a profile management function on the M2M device 104 may perform the operation initiated by the command. Once the operation on the eSIM profile 108 is performed, the profile management function on the M2M device 104 may return a confirmation message to the subscription management service 110 indicating that the operation on the eSIM profile 108 is complete.

The receipt of the confirmation message may trigger the subscription management service 110 to send a callback message 126 to the backend service 112. The callback message 126 may include event data 128 that indicates the type of the operation that is completed on the eSIM profile (e.g., enable, disable, or deletion). Further, rather than simply containing the transaction identifier originally assigned by the backend service 112 for the operation request 114, the callback message 126 may contain a set of enhanced transaction data. In various embodiments, the enhanced transaction data may include an ICCID 130 that identifies the eSIM profile 108, an EID 132 that identifies the eUICC 106, and/or a timestamp 134. The timestamp 134 may include a time and a date that the confirmation message is received from the M2M device 104, or a time and a date that the subscription management service 110 sent the callback message to the backend service 112. Alternatively, the timestamp 134 may include a time and a date from the M2M device 104, in which the time stamp indicates the time and the date that the M2M device 104 completed the operation on the eSIM profile 108.

Accordingly, the backend service 112 may use the ICCID 130 or the EID 132 to locate a profile state entry for the eSIM profile 108 in a profile state database 136. In various embodiments, each of the profile state entries in the profile state database 136 may be indexed via a corresponding ICCID or EID. Accordingly, a query function of the profile state database 136 may compare the ICCID or EID of each profile state entry to the ICCID 130 or the EID 132 to locate a particular profile state entry. Once the profile state entry is located, the profile state of the eSIM profile 108 may be updated based on the operation performed as indicated in the event data 128. For example, if the eSIM profile 108 is activated for use to receive telecommunication services, the backend service 112 may update the profile state entry to indicate that the eSIM profile 108 has an activated state. However, if the eSIM profile 108 is disabled to terminate access of the M2M device 104 to the telecommunication services, the backend service 112 may update the profile state entry to indicate that the eSIM profile 108 has a disabled state. Likewise, if the eSIM profile 108 is deleted from the eUICC 106 of the M2M 104, the backend service 112 may update the profile state entry to indicate that the eSIM profile is deleted.

Further, additional backend services of the wireless communication carrier 102 and/or third-party services may obtain the updated profile state of the eSIM profile 108 from the profile state database 136. For example, the third-party services may be provided by M2M device vendors or M2M device operators. Alternatively, the backend service 112 may push notifications of the update to the profile state of the eSIM profile 108 to the additional backend services and/or third-party services.

Figure 2:
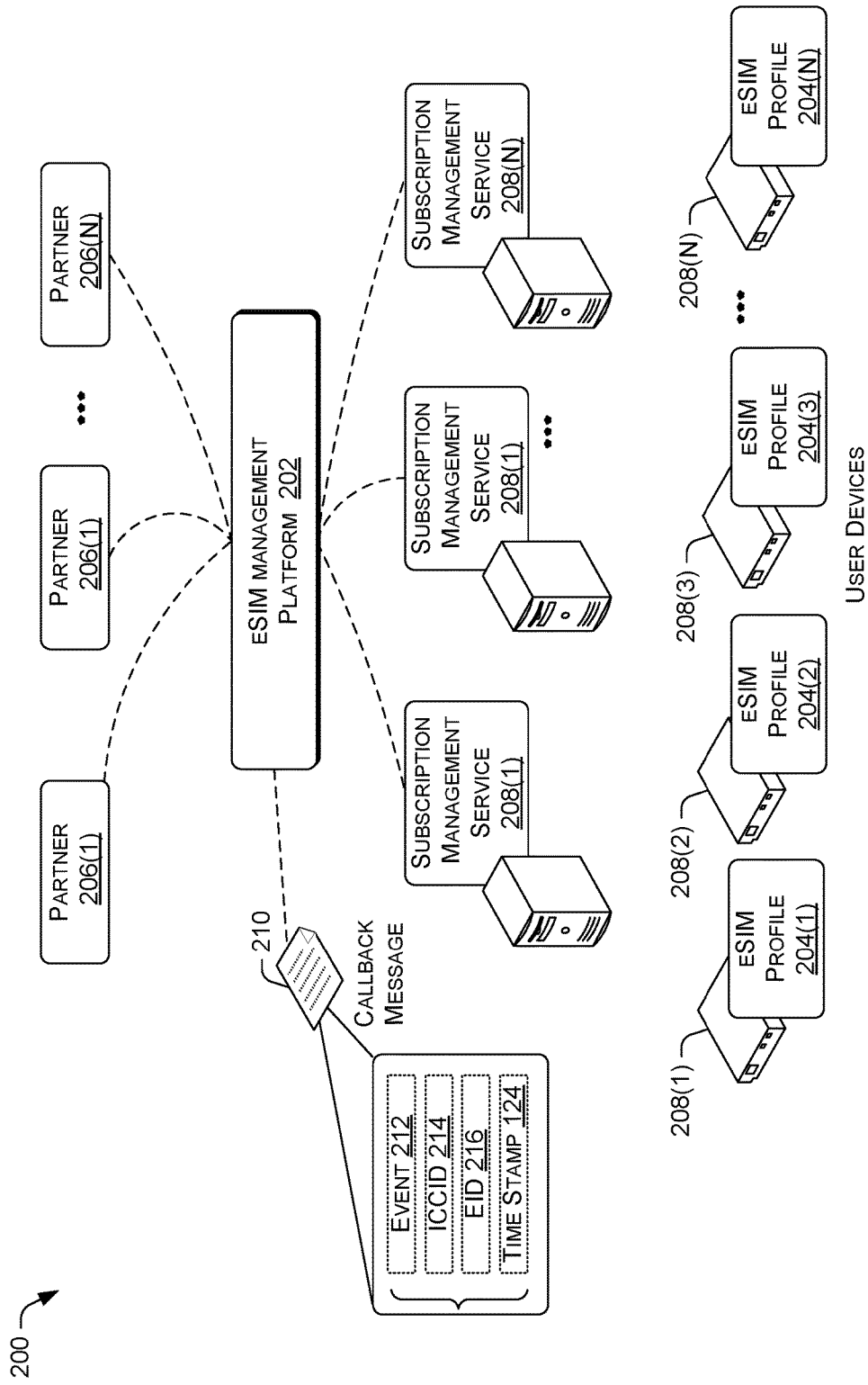
FIG. 2 illustrates an additional example architecture for the implementation of data enhancements to eSIM profile operation callbacks.

FIG. 2 illustrates an additional example architecture 200 for the implementation of data enhancements to eSIM profile operation callbacks. The architecture 200 includes a backend service in the form of an eSIM profile management platform 202 that is operated by a wireless communication carrier 102. The eSIM profile management platform 202 is responsible for managing a multitude of eSIM profiles 204(1)-204(N) for multiple partners, such as the partners 206(1)-206(N). In various embodiments, the partners may include M2M device vendors, M2M device operators, content providers, service providers, and/or so forth. The multitude of eSIM profiles 204(1)-204(N) may be deployed on multiple user devices, such as the user devices 208(1)-208(N). The eSIM profile management platform 202 may use multiple subscription management services 210(1)-210(N) to manage the eSIM profiles 204(1)-204(N), in which each of the subscription management services is provided by a corresponding set of SM-DP and/or SM-SR managers. For example, each of the subscription management services 210(1)-210(N) may be responsible for initiating operations with respect to a corresponding set of eSIM profiles deployed on associated user devices.

Accordingly, the eSIM profile management platform 202 may receive operation requests from the partners 204(1)-204(N), and routing each request to the corresponding user device via an appropriate subscription management service. As described with respect to FIG. 1, each of the subscription management services 208(1)-208(N) may have the ability to return callback messages that include enhanced transaction data. For example, the callback 212 may include event data 214 that indicates the type of the operation that is completed on an eSIM profile (e.g., enable, disable, or deletion). The enhanced transaction data may include an ICCID 216 that identifies the eSIM profile, an EID 218 that identifies the eUICC in which the eSIM profile is deployed, and/or a timestamp 220.

In the architecture 200, the numbers of eSIM operation requests that are handled by the eSIM profile management platform 202 may be greatly expanded due to the use of multiple subscription management services. Accordingly, the ability of the subscription management services 210(1)-210(N) to send callback messages with enhanced transaction data to simplify and speed up the updating of profile states of eSIM profiles by the platform may significantly reduce profile state update latency and decrease delays in notifying the partners of profile state changes for the eSIM profiles 204(1)-204(N).

Example Computing Device Components

Figure 3:
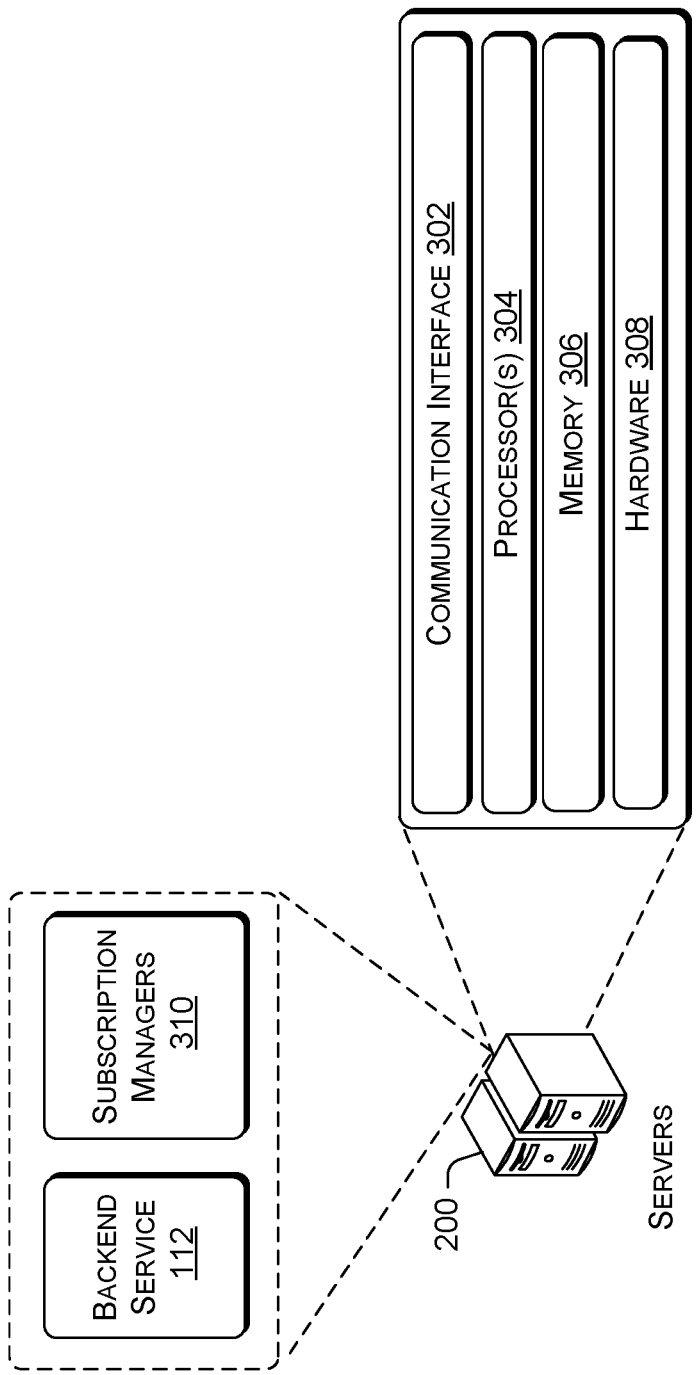
FIG. 3 is a block diagram showing various components of one or more illustrative computing devices that support the implementation of data enhancements for eSIM profile operation callbacks.

FIG. 3 is a block diagram showing various components of one or more illustrative computing devices that support the implementation of data enhancements for eSIM profile operation callbacks. The computing devices 300 may include a communication interface 302, one or more processors 304, memory 306, and hardware 308. The communication interface 302 may include wireless and/or wired communication components that enable the computing devices 300 to transmit data to and receive data from other networked devices. The hardware 308 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. In other embodiments, the computing devices 300 or components thereof may be virtual computing devices in the form of virtual machines or software containers that are hosted in a computing cloud.

The computing devices 300 may implement various backend services and components of the wireless communication carrier 102, such as the BSS and the OSS responsible for providing backend service 112, as well as subscription managers 310 that provide the subscription management service 110. The implementation involves the execution of software, applications, and/or modules that include routines, program instructions, code segments, objects, and/or data structures that perform particular tasks or implement particular abstract data types.

Example Processes

Figure 4:
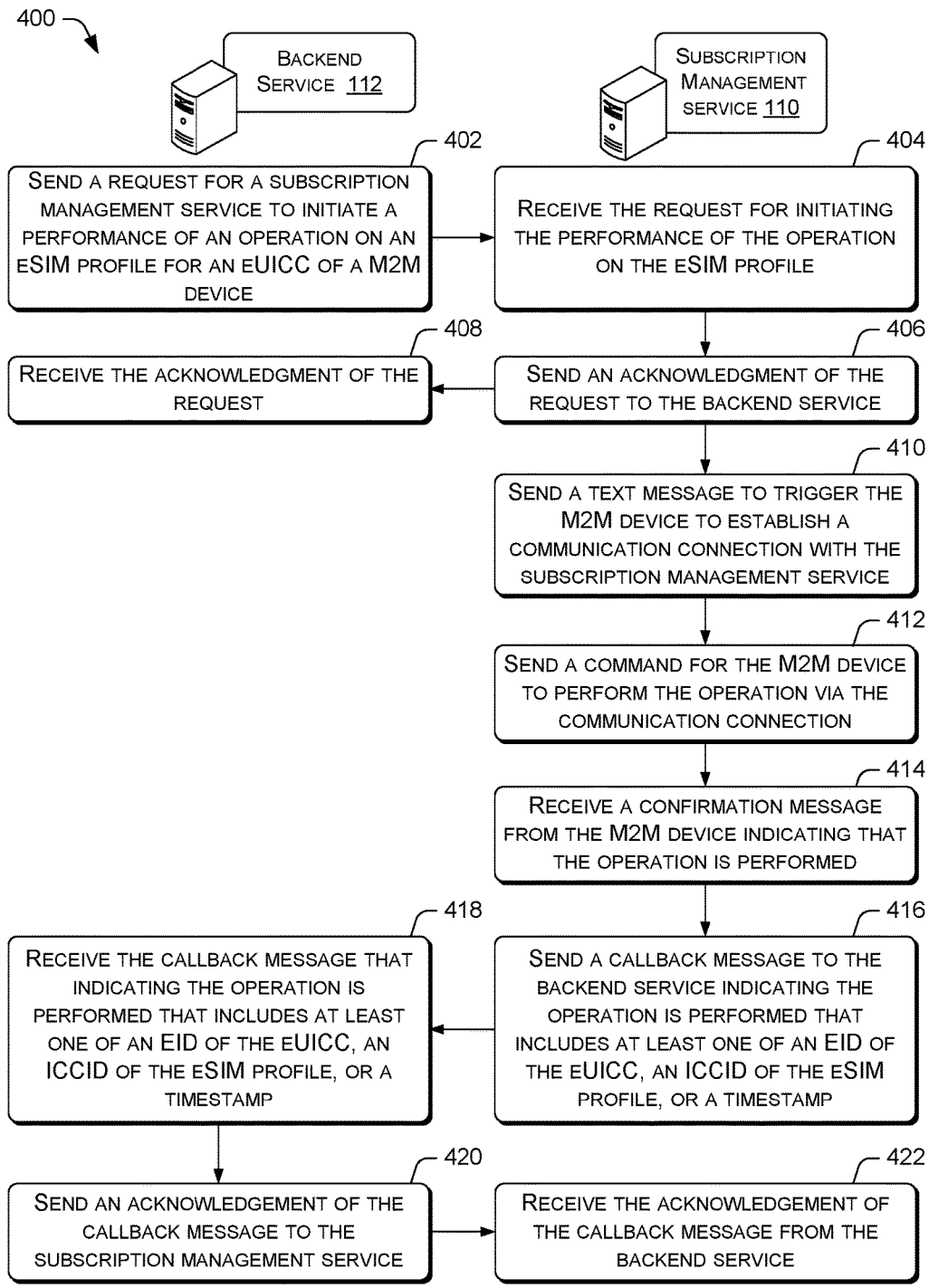
FIG. 4 is a flow diagram of an example process for a subscription management service to send a data enhanced callback message to a backend service of a wireless communication carrier.
Figure 5:
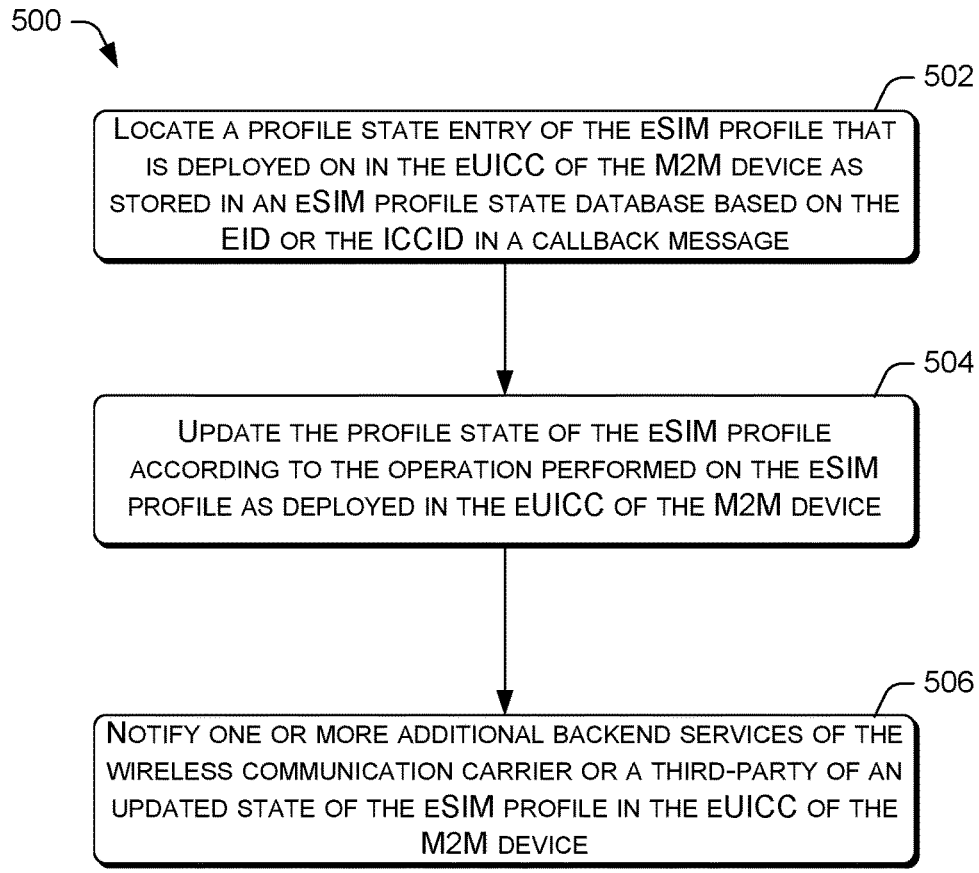
FIG. 5 is a flow diagram of an example process for using a data enhanced callback message to perform additional tasks.

FIGS. 4 and 5 present illustrative processes 400 and 500 for a wireless communication carrier to implement data enhancements for eSIM profile operation callbacks. Each of the processes 400 and 500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400 and 500 are described with reference to the architectures 100 and 200.

FIG. 4 is a flow diagram of an example process 400 for a subscription management service to send a data enhanced callback message to a backend service of a wireless communication carrier. At block 402, the backend service 112 may send a request for a subscription management service 110 to initiate a performance of an operation on the eSIM profile 108 that is stored in the eUICC 106 of the M2M device 104. For example, the operation may involve activating the eSIM profile 108 for use to receive telecommunication services from the wireless communication carrier 102, disabling the eSIM profile 108 to terminate access of the M2M device to the telecommunication services, or deleting the eSIM profile 108 from the eUICC 106. At block 404, the subscription management service 110 may receive the request for initiating the performance of the operation on the eSIM profile 108.

At block 406, the subscription management service 110 may send an acknowledgment of the request to the backend service 112. At block 408, the subscription management service 110 may receive the acknowledgement of the request. At block 410, the subscription management service 110 may send a text message to the M2M device 104 to trigger the M2M device 104 to establish a communication connection with the subscription management service 110. In various embodiments, the subscription management service 110 may activate the SMSC 118 to send the text message to the M2M device 104. The text message may cause the M2M device 104 to contact the subscription management service 110 so that the communication connection is created between the subscription management service 110 and the M2M device 104.

At block 412, the backend service 112 may send a command via the for the M2M device 104 to perform the operation on the eSIM profile 108. In turn, a profile management function on the M2M device 104 may perform the operation initiated by the command. Once the operation on the eSIM profile 108 is performed, the profile management function on the M2M device 104 may return a confirmation message to the subscription management service 110 indicating that the operation on the eSIM profile 108 is complete. At block 414, the subscription management service 110 may receive the confirmation message from the M2M device 104 indicating that the operation is performed.

At block 416, the subscription management service 110 may send a callback message to the backend service 112 indicating the operation is performed. In various embodiments, the callback message contains enhanced transaction data that include the ICCID 130 that identifies the eSIM profile 108, the EID 132 that identifies the eUICC 106, and/or a timestamp. At block 418, the backend service 112 may receive the callback message that contains the enhanced transaction data. At block 420, the backend service 112 may send an acknowledgment of the callback message to the subscription management service 110. At block 422, the subscription management service 110 may receive the acknowledgment of the callback message from the backend service 112.

FIG. 5 is a flow diagram of an example process 500 for using a data enhanced callback message to perform additional tasks. The process 500 may be performed following the process 400 by the backend service 112. At block 502, the backend service 112 may use the ICCID 130 or the EID 132 in the callback message 126 to locate a profile state entry for the eSIM profile 108 in a profile state database 136. The eSIM profile 108 is deployed in the eUICC 106 of the M2M device 104. At block 504, the backend service 112 may update the profile state of the eSIM profile 108 in the profile state entry that has been located. The profile state of the eSIM profile 108 is updated based on the operation that is performed on the eSIM profile 108. For example, the operation may involve activating the eSIM profile 108 for use to receive telecommunication services from the wireless communication carrier 102, disabling the eSIM profile 108 to terminate access of the M2M device to the telecommunication services, or deleting the eSIM profile 108 from the eUICC 106. At block 506, the backend service 112 may notify one or more additional backend services of the wireless communication carrier 102 or a third-party or a third-party of an updated state of the eSIM profile 108 in the eUICC 106 of the M2M device 104. In various embodiments, the notifications may be provided a push notification or a pull notification that is sent via a communication channel between the services.

The ability of the subscription management service to return callback messages that contain enhanced transaction data may save the backend service from consuming valuable computational time and processing resources associated with locating eSIM profile states to be updated using transaction identifiers. Furthermore, the use of enhanced transaction data by the backend service to expedite the update of eSIM profile states that reflected operational changes to eSIM profiles may be critical for time sensitive deployment and/or operational changes to M2M devices that perform key functions.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:

sending a command for a machine-to-machine (M2M) device to perform an operation on an embedded subscriber identity module (eSIM) profile stored in an embedded universal integrated circuit card (eUICC) of the M2M device, the operation being request by a backend service of a wireless communication carrier;

receiving a confirmation message from the M2M device indicating that the operation on the eSIM profile is performed; and sending a callback message to the backend service of the wireless communication carrier indicating that the operation is performed, the callback message including an eUICC identifier (ID) of the eUICC or an Integrated Circuit Card identifier (ICCID) of the eSIM profile, the eUICC ID or the ICCID being used by the backend service to locate a profile state entry of the eSIM profile in an eSIM profile state database for update with a profile state of the eSIM profile after the operation.

2. The one or more non-transitory computer-readable media of claim 1, wherein the sending the command includes sending the command via a communication connection that is established between a subscription management service of the wireless communication carrier and the M2M device, and wherein the receiving includes receiving the confirmation message via the communication connection.

3. The one or more non-transitory computer-readable media of claim 2, wherein the acts further comprise, prior to sending the command:
receiving a request from the backend service to initiate a performance of the operation on the eSIM profile; and
sending a text message to trigger the M2M device to establish the communication connection with the subscription management service of the wireless communication carrier.

4. The one or more non-transitory computer-readable media of claim 3, wherein sending the text message includes sending a message request to a short message service center (SMSC) of the wireless communication carrier to prompt the SMSC to send a short messaging service (SMS) message to the M2M device.

5. The one or more non-transitory computer-readable media of claim 2, wherein the subscription management service is provided by one or more subscription managers that execute on one or more computing devices, the one or more subscription managers including at least one of a Subscription Manager Data Preparation (SM-DP) or a Subscription Manager Secure Routing (SM-SR).

6. The one or more non-transitory computer-readable media of claim 1, wherein the operation on the eSIM profile activates the eSIM profile for use to receive telecommunication services from the wireless communication carrier, disables the eSIM profile to terminate access of the M2M device to the telecommunication services, or deletes the eSIM profile from the eUICC.

7. The one or more non-transitory computer-readable media of claim 1, wherein callback message further includes a timestamp, the timestamp including a date and a time that confirmation message is received from the M2M device, a time and a date that a subscription management service sent the callback message to the backend service, or a time and a date that the M2M device completed the operation on the eSIM profile.

8. The one or more non-transitory computer-readable media of claim 1, wherein the backend service is provided by at least one of business support systems (BSS) or operation support systems (OSS) of the wireless communication carrier.

9. The one or more non-transitory computer-readable media of claim 1, wherein the profile state of the eSIM profile after the operation is provided by the backend service to at least one of one or more additional backend services of the wireless communication carrier or one or more third-party services.

10. A system, comprising:
one or more processors; and
memory including a plurality of computer-executable components that are executable by the one or more processors to perform a plurality of actions, the plurality of actions comprising:
sending a command for a machine-to-machine (M2M) device to perform an operation on an embedded subscriber identity module (eSIM) profile stored in an embedded universal integrated circuit card (eUICC) of the M2M device, the operation being request by a backend service of a wireless communication carrier to activate the eSIM profile for use to receive telecommunication services from the wireless communication carrier, disable the eSIM profile to terminate access of the M2M device to the telecommunication services, or delete the eSIM profile from the eUICC;
receiving a confirmation message from the M2M device indicating that the operation on the eSIM profile is performed; and
sending a callback message to the backend service of the wireless communication carrier indicating that the operation is performed, the callback message including an eUICC identifier (ID) of the eUICC or Integrated Circuit Card identifier (ICCID) of the eSIM profile, the eUICC ID or the ICCID being used by the backend service to locate a profile state entry of the eSIM profile in an eSIM profile state database for update with a profile state of the eSIM profile after the operation.

11. The system of claim 10, wherein callback message further includes a timestamp, the timestamp including a date and a time that confirmation message is received from the M2M device, a time and a date that a subscription management service sent the callback message to the backend service, or a time and a date that the M2M device completed the operation on the eSIM profile.

12. The system of claim 11, wherein the subscription management service is provided by one or more subscription managers that execute on one or more computing devices, the one or more subscription managers including at least one of a Subscription Manager Data Preparation (SM-DP) or a Subscription Manager Secure Routing (SM-SR).

13. The system of claim 10, wherein the backend service is provided by at least one of business support systems (BSS) or operation support systems (OSS) of the wireless communication carrier.

14. A computer-implemented method, comprising:
sending a command for a machine-to-machine (M2M) device to perform an operation on an embedded subscriber identity module (eSIM) profile stored in an embedded universal integrated circuit card (eUICC) of the M2M device, the operation being request by a backend service of a wireless communication carrier;
receiving a confirmation message from the M2M device indicating that the operation on the eSIM profile is performed; and
sending a callback message to the backend service of the wireless communication carrier indicating that the operation is performed, the callback message including an eUICC identifier (ID) of the eUICC or an Integrated Circuit Card identifier (ICCID) of the eSIM profile, the eUICC ID or the ICCID being used by the backend service to locate a profile state entry of the eSIM profile in an eSIM profile state database for update with a profile state of the eSIM profile after the operation.

15. The computer-implemented method of claim 14, wherein the sending the command includes sending the command via a communication connection that is established between a subscription management service of the wireless communication carrier and the M2M device, and wherein the receiving includes receiving the confirmation message via the communication connection.

16. The computer-implemented method of claim 15, further comprise, prior to sending the command:
   receiving a request from the backend service to initiate a performance of the operation on the eSIM profile; and
   sending a text message to trigger the M2M device to establish the communication connection with the subscription management service of the wireless communication carrier.

17. The computer-implemented method of claim 16, wherein sending the text message includes sending a message request to a short message service center (SMSC) of the wireless communication carrier to prompt the SMSC to send a short messaging service (SMS) message to the M2M device.

18. The computer-implemented method of claim 15, wherein the subscription management service is provided by one or more subscription managers that execute on one or more computing devices, the one or more subscription managers including at least one of a Subscription Manager Data Preparation (SM-DP) or a Subscription Manager Secure Routing (SM-SR).

19. The computer-implemented method of claim 14, wherein the operation on the eSIM profile activates the eSIM profile for use to receive telecommunication services from the wireless communication carrier, disables the eSIM profile to terminate access of the M2M device to the telecommunication services, or deletes the eSIM profile from the eUICC.

20. The computer-implemented method of claim 14, wherein callback message further includes a timestamp, the timestamp including a date and a time that confirmation message is received from the M2M device, a time and a date that a subscription management service sent the callback message to the backend service, or a time and a date that the M2M device completed the operation on the eSIM profile.

* * * * *